US008719630B2

(12) United States Patent
Chen et al.

(10) Patent No.: US 8,719,630 B2
(45) Date of Patent: May 6, 2014

(54) METHOD AND APPARATUS FOR MONITORING INTERRUPTS DURING A POWER DOWN EVENT AT A PROCESSOR

(75) Inventors: Xufeng Chen, San Diego, CA (US); Peixin Zhong, San Diego, CA (US); Manojkumar Pyla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 12/861,171

(22) Filed: Aug. 23, 2010

(65) Prior Publication Data

US 2012/0047402 A1 Feb. 23, 2012

(51) Int. Cl.
*G06F 11/00* (2006.01)

(52) U.S. Cl.
USPC .......... 714/20

(58) Field of Classification Search
USPC .......... 714/20, 38.13, 47.3; 710/267
See application file for complete search history.

(56) References Cited

U.S. PATENT DOCUMENTS 4,159,516 A 6/1979 Henrion et al.
5,551,044 A 8/1996 Shah et al.
5,701,488 A * 12/1997 Mulchandani et al. ....... 717/128
5,926,640 A 7/1999 Mason et al.
6,792,551 B2 9/2004 Dai
7,069,367 B2 6/2006 Poisner et al.
7,624,215 B2 11/2009 Axford et al.
2002/0161961 A1 10/2002 Hardin et al.
2006/0053326 A1 3/2006 Naveh et al.
2007/0260794 A1 11/2007 Ashish et al.
2008/0209233 A1 8/2008 Kumar et al.
2008/0320555 A1 * 12/2008 Ciaffi et al. .......... 726/2
2009/0164817 A1 * 6/2009 Axford et al. .......... 713/322

FOREIGN PATENT DOCUMENTS

EP 0884684 A1 12/1998
GB 2463800 A 3/2010

OTHER PUBLICATIONS

Partial International Search Report—PCT/US2011/048661—ISA/EPO—Dec. 12, 2011.
International Search Report and Written Opinion—PCT/US2011/048661—ISA/EPO—Mar. 1, 2012.

* cited by examiner

*Primary Examiner* — Yair Leibovich
(74) *Attorney, Agent, or Firm* — Peter Michael Karmarchik; Nicholas J. Pauley; Joseph Agusta

(57) ABSTRACT

In a particular embodiment, a method of monitoring interrupts during a power down event at a processor includes activating an interrupt monitor to detect interrupts. The method also includes isolating an interrupt controller of the processor from the interrupt monitor, where the interrupt controller shares a power domain with the processor. The method also includes detecting interrupts at the interrupt monitor during a power down time period associated with the power down event.

25 Claims, 5 Drawing Sheets

400

402 Disable interrupts at the processor

404 Clear any prior interrupt stored at an interrupt monitor

406 Activate the interrupt monitor to detect interrupts

408 Isolate an interrupt controller of the processor from the interrupt monitor, where the interrupt controller shares the power domain with the processor 410 Check the interrupt controller for pending interrupts and copy the pending interrupts to the interrupt monitor prior to re-enabling interrupts at the processor 412 Detect interrupts at the interrupt monitor during a power down time period associated with the power down event and store any detected interrupts 414 Re-enable interrupts at the processor after the processor power is restored 416 Replay the interrupts stored by the interrupt monitor to the interrupt controller to be processed by the processor when the processor is powered up 200
202
Interrupt Monitor
104
Processor
(e.g., multi-thread processor)
222
246
224
0
1
214
106
Interrupt Controller
254
Interrupt Source
110
220
0
1
218
Interrupt Detection Circuit
226
Edge Detection Circuit
252
Pending Interrupts
240
Low Logic Level
228
Memory
242
244
238
230
232
234
236
State Machine
256
Power Manager
216

METHOD AND APPARATUS FOR MONITORING INTERRUPTS DURING A POWER DOWN EVENT AT A PROCESSOR

I. FIELD

The present disclosure is generally related to a method and apparatus to monitor interrupts during a power down event at a processor.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Such portable computing devices may include a processor having an interrupt controller that is configured to receive and process interrupts. To reduce power consumption, the processor and interrupt controller may be placed in a low power state. However, interrupts arriving at the interrupt controller when the processor and the interrupt controller are placed in a low power state may be lost.

III. SUMMARY

An interrupt monitor circuit is proposed that is external to a processor and is on a different power rail than the processor. The interrupt monitor circuit keeps track of incoming interrupts during a low power state at the processor. The interrupt monitor may support both edge and level sensitive interrupts. The interrupt monitor is configured to isolate an interrupt controller inside the processor from the interrupt monitor. When the processor is powered up from the low power state, the interrupt monitor may automatically replay interrupts recorded while the processor was in the low power state.

In a particular embodiment, a method of monitoring interrupts during a power down event at a processor includes activating an interrupt monitor to detect interrupts. The method also includes isolating an interrupt controller of the processor from the interrupt monitor, where the interrupt controller shares the power domain with the processor. The method also includes detecting interrupts at the interrupt monitor during a power down time period associated with the power down event.

In another particular embodiment, a method of monitoring interrupts during a power down event at a processor includes clearing any prior interrupt stored at an interrupt monitor. The method also includes activating the interrupt monitor to detect interrupts and isolating an interrupt controller of the processor from the interrupt monitor, where the interrupt controller shares the power domain with the processor. The method also includes detecting interrupts at the interrupt monitor during a power down time period associated with the power down event and storing any detected interrupts. The method further includes, when the processor is powered up, replaying at least some of the interrupts stored by the interrupt monitor to the interrupt controller for processing by the processor.

In another particular embodiment, an interrupt monitor includes an interrupt detection circuit to detect interrupts. The interrupt monitor also includes a first multiplexer to selectively provide incoming interrupts to the interrupt detection circuit during a power down time period associated with a power down event. The interrupt monitor also includes a second multiplexer to selectively isolate an interrupt controller of a processor from the interrupt monitor. The interrupt controller shares a power domain with the processor. The interrupt monitor further includes a memory to save detected interrupts.

In another particular embodiment, an apparatus includes a processor that includes an interrupt controller. The apparatus also includes an interrupt monitor coupled to the processor. The interrupt monitor includes an interrupt detection circuit to detect interrupts. The interrupt monitor also includes a first multiplexer to selectively provide incoming interrupts to the interrupt detection circuit during a power down time period associated with a power down event. The interrupt monitor further includes a second multiplexer to selectively isolate the interrupt controller from the interrupt monitor.

One particular advantage provided by at least one of the disclosed embodiments is that interrupts are retained during a power down event.

Other aspects, advantages, and features of the present disclosure will become apparent after review of the entire application, including the following sections: Brief Description of the Drawings, Detailed Description, and the Claims.

IV BRIEF DESCRIPTION OF THE DRAWINGS

V. DETAILED DESCRIPTION

A processor is described that receives interrupts from an interrupt source, such as another component in a system that is requesting use of the processor. An interrupt monitor receives the interrupts and forwards the interrupts on to the processor when the processor is powered on. When the processor is in a low power state (e.g., powered off, standby, sleep, suspend, hibernate), the processor is isolated from the incoming interrupts received at the interrupt monitor. In this case, the interrupt monitor stores interrupts that are pending at the processor prior to the processor entering the low power state and stores the interrupts that are received when the processor is in the low power state. When the processor is powered on again after the low power state, the stored interrupts may be replayed at the interrupt controller so that the processor may once again receive incoming interrupts.

Figure 1:
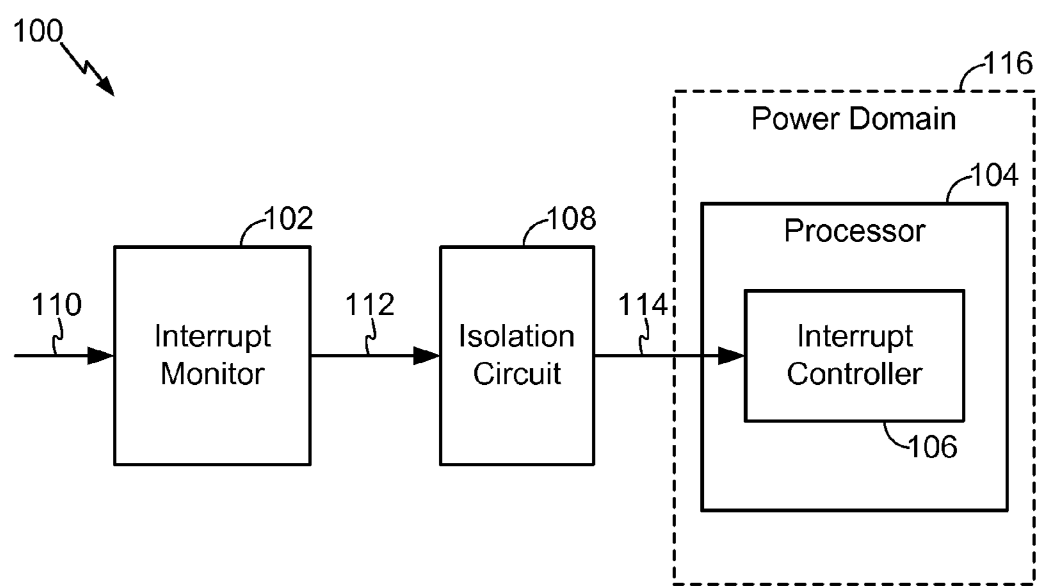
FIG. 1 is a block diagram of a particular illustrative embodiment of an apparatus to monitor interrupts during a power event.

Referring to FIG. 1, a particular illustrative embodiment of an apparatus to monitor interrupts during a power down event is disclosed and generally designated 100. The apparatus 100 includes an interrupt monitor 102, a processor 104, and an isolation circuit 108. The processor 104 includes an interrupt controller 106 for processing interrupts received at the processor 104. The processor 104 and the interrupt controller 106 are configured to share a power domain 116.

In a particular illustrative embodiment, the interrupt monitor 102 receives the interrupts at a data path 110. The interrupt monitor 102 may be configured to pass the interrupts to the isolation circuit 108 via a data path 112. The isolation circuit 108 may be configured to selectively pass the interrupts to the interrupt controller 106 via a data path 114. For example, the isolation circuit 108 may be configured to pass the interrupts to the interrupt controller 106 while the power domain 116 is in a powered up state. The isolation circuit 108 may be configured to isolate the processor 104 and the interrupt controller 106 from the interrupts during a power down event at the power domain 116 or a component of the power domain 116, such as the processor 104. The power down event may result in one or more components of the power domain 116 (e.g., the processor 104) entering a low power state. For example, a low power state may be a state of reduced power (e.g., standby, hibernate, suspend) or a state of no power (e.g., power off) at one or more components of the power domain 116 (e.g., the processor 104, the interrupt controller 106). It should be understood that while the isolation circuit 108 is shown as separate from the interrupt monitor 102, the isolation circuit 108 may be part of the interrupt monitor 102.

The interrupt monitor 102 may be configured to detect interrupts while the processor 104 is in a low power state. The interrupt monitor 102 may be configured to detect incoming interrupts prior to the processor 104 entering a low power state and to continue detecting interrupts during the low power state. For example, the interrupt monitor 102 may be configured to detect interrupts during a power down time period associated with the power down event. The interrupt monitor 102 may be further configured to save the detected interrupts and replay the saved interrupts to the interrupt controller 106 when the processor 104 returns to a powered up state.

In a particular embodiment, the processor 104 may be a digital signal processor (DSP). The processor 104 may be configured to process a single thread or multiple threads. The interrupt controller 106 may be located inside or outside of the processor 104.

Figure 2:
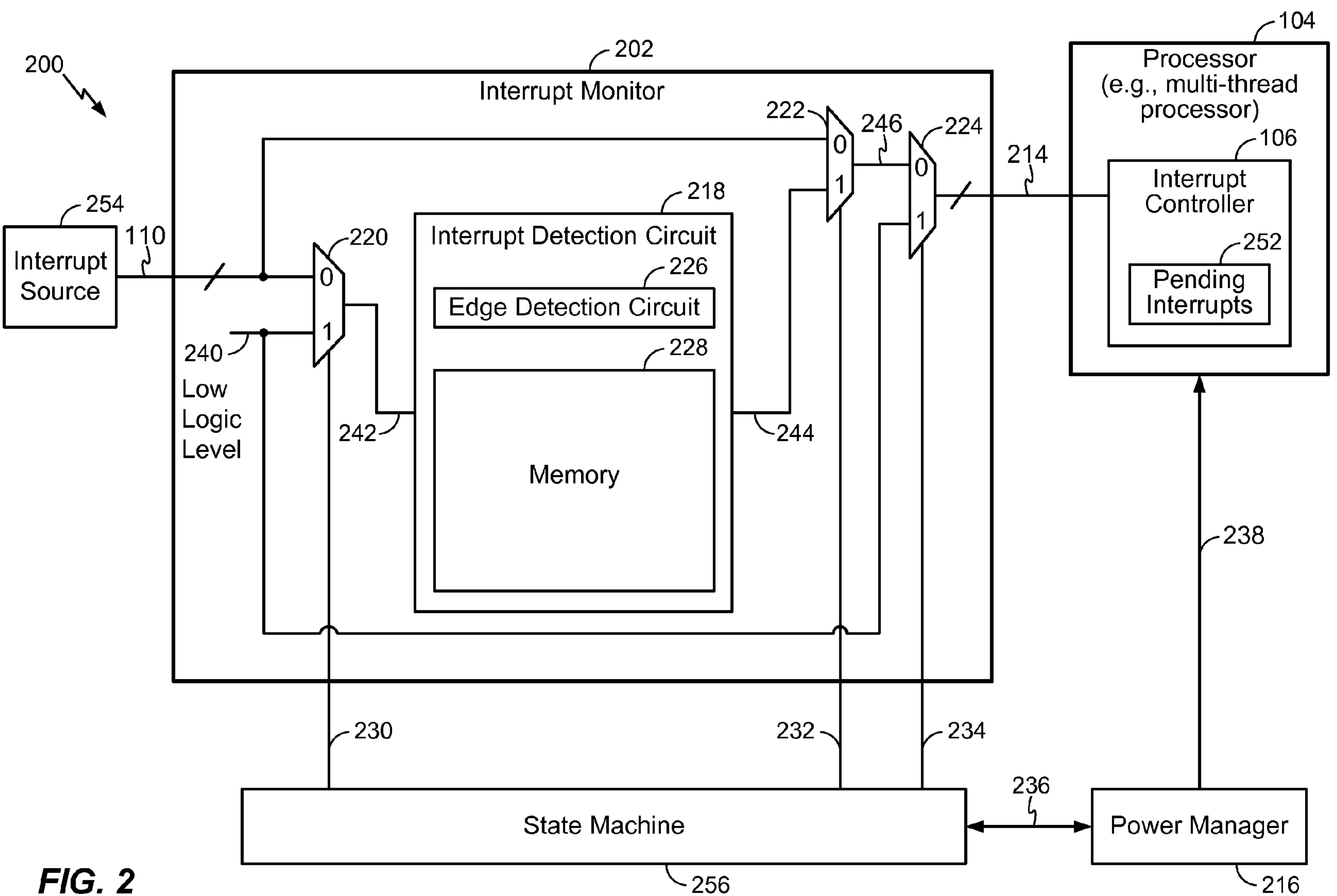
FIG. 2 is a block diagram of a second particular illustrative embodiment of an apparatus to monitor interrupts during a power event.

Referring to FIG. 2, a particular illustrative embodiment of an apparatus to monitor interrupts during a power down event is disclosed and generally designated 200. The apparatus 200 includes an interrupt source 254, an interrupt monitor 202, the processor 104, the interrupt controller 106, a state machine 256, and a power manager 216.

The power manager 216 may be configured to provide power to the processor 104 and to the interrupt controller 106 via a power line 238. Further, the power manager 216 may be configured to communicate the power state (e.g., on, off, standby, hibernate, and suspend) of the processor 104 and the interrupt controller 106 to the state machine 256 via a data path 236.

The interrupt monitor 202 includes an interrupt detection circuit 218, a multiplexer 220, a multiplexer 222, and a multiplexer 224. The interrupt detection circuit 218 includes an edge detection circuit 226 and a memory 228. The memory 228 may include one or more registers using flip-flops or any other type of memory configuration to store interrupts, such as edge triggered interrupts and level triggered interrupts. For example, the memory 228 may include asynchronous flip-flops to enable asynchronous recording of incoming interrupts.

The multiplexer 220 may be configured to control an input to the interrupt detection circuit 218 based on a control signal received from the state machine 256 via a data path 230. For example, in response to receiving an indication from the power manager 216 that the processor 104 is preparing to enter a low power mode (or is already in a low power mode), the state machine 256 may provide a first control signal to the multiplexer 220. In response to receiving the first control signal, the multiplexer 220 may provide an interrupt received from the interrupt source 254 (via the data path 110) to the interrupt detection circuit 218. Alternatively, in response to receiving an indication from the power manager 216 that the processor 104 is not in a low power mode (or is not preparing to enter a low power mode), the state machine 256 may provide a second control signal to the multiplexer 220. In response to receiving the second control signal, the multiplexer 220 may provide a low logic level via a data path 240 to the interrupt detection circuit 218. In this case, the interrupt detection circuit 218 is prevented from receiving interrupts from the interrupt source 254.

The interrupt detection circuit 218 receives output data from the multiplexer 220 via the data path 242. The interrupt detection circuit 218 provides output data to the multiplexer 222 via the data path 244. The interrupt detection circuit 218 may begin detecting interrupts when the state machine 256 causes the multiplexer 220 to provide interrupts received from the interrupt source 254 to the interrupt detection circuit 218. The interrupts received at the interrupt detection circuit 218 may be stored at the memory 228. The edge detection circuit 226 may be configured to detect an interrupt received at the interrupt detection circuit 218, such as an edge triggered interrupt or a level type interrupt. The received interrupts may be saved in the memory 228 for later reproduction to the processor 104.

The multiplexer 222 may be configured to control an input to the multiplexer 224 based on a control signal received from the state machine 256 via a data path 232. For example, in response to receiving an indication from the power manager 216 that the processor 104 is being maintained in a power on state, the state machine 256 may provide a first control signal to the multiplexer 222. In response to receiving the first control signal, the multiplexer 222 may provide an interrupt received from the interrupt source 254 via the data path 110 to the multiplexer 224. Alternatively, in response to receiving an indication from the power manager 216 that the processor 104 is in a power up mode (e.g., after the processor 104 is shut down, the processor may be turned on) or that the processor 104 is powered on after a power down, the state machine 256 may provide a second control signal to the multiplexer 222. In response to receiving the second control signal, the multiplexer 222 may provide an interrupt received from the interrupt detection circuit 218 (e.g., an interrupt stored at the memory 228) to the multiplexer 224. In this case, interrupts that are stored in the interrupt detection circuit 218 while the processor is powered down (or powering down) may be provided to the multiplexer 224 after the processor 104 is powered up.

The multiplexer 224 may be configured to control an input to the processor 104 based on a control signal received from the state machine 256 via a data path 234. For example, in response to receiving an indication from the power manager 216 that the processor 104 is being maintained in a power on state, the state machine 256 may provide a first control signal to the multiplexer 224. In response to receiving the first control signal, the multiplexer 224 may provide an interrupt received from the interrupt source 254 (via the data path 110, the multiplexer 222, and the data path 246) to the processor 104. Alternatively, in response to receiving an indication from the power manager 216 that the processor 104 is preparing to enter a low power mode (or is already in a low power mode), the state machine 256 may provide a second control signal to the multiplexer 224. In response to receiving the second control signal, the multiplexer 224 may provide a low logic level via the data path 240 to the processor 104. In this case, the processor 104 is prevented from receiving interrupts from the interrupt source 254 or stored interrupts from the interrupt detection circuit 218.

When a power down event is initiated by the power manager 216, there may be pending interrupts 252 at the interrupt controller 106 that will not be processed prior to the power down event. The processor 104 may be configured to check the interrupt controller 106 for the pending interrupts 252. The processor 104 may copy the identified pending interrupts 252 to the memory 228 of the interrupt detection circuit 218. The pending interrupts stored at the memory 228 may be replayed to the interrupt controller 106 upon power up of the processor 104 after a power down event. For example, the pending interrupts 252 may be replayed before any subsequently received interrupts that are stored in the memory 228.

Figure 3:
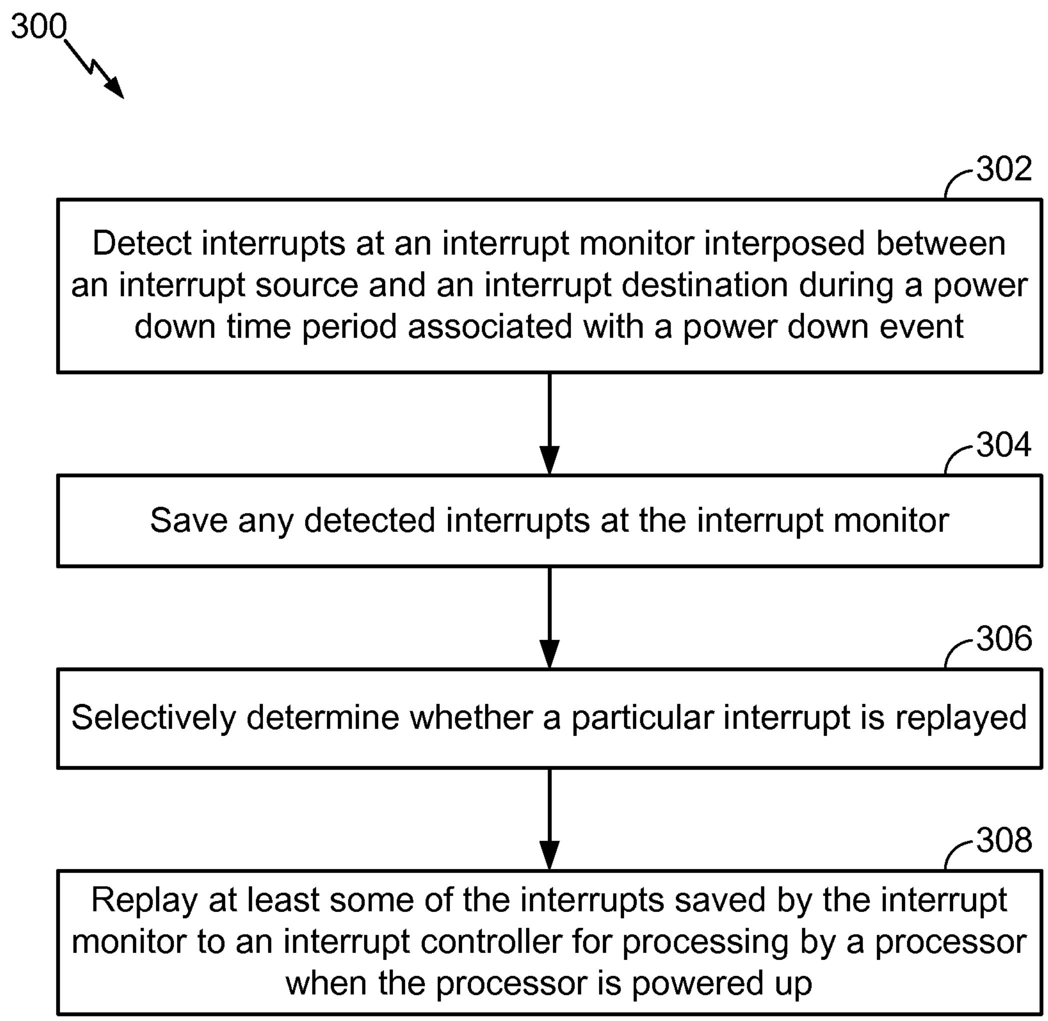
FIG. 3 is a flow chart of a particular illustrative embodiment of a method of monitoring interrupts during a power event.

Referring to FIG. 3, a particular embodiment of a method 300 of monitoring interrupts during a power down event at a processor is illustrated. The method 300 may include detecting interrupts at an interrupt monitor interposed between an interrupt source and an interrupt destination during a power down time period associated with a power down event, at 302. For example, during a power down time associated with the power down event, the interrupt monitor 102 of FIG. 1 may receive and detect interrupts via the data path 110. The power down time period may be a predetermined amount of time or the time during which the processor 104 and the interrupt controller 106 are in a low power state. The low power state may end when the power down time period expires, when an external event (e.g., the actuation of a power button) occurs, or when another system or subsystem coupled to the processor 104 uses the processor 104. The interrupt monitor 102 may also detect interrupts when the processor 104 and the interrupt controller 106 are preparing to enter the low power state.

The method 300 may further include saving any detected interrupts at the interrupt monitor, at 304. For example, the interrupt monitor 102 may include circuitry to save the detected interrupt, such as the memory 228 of FIG. 2. The memory 228 may include one or more registers using flip-flops or any other type of memory configuration to save the detected interrupts. The saved interrupts may include edge triggered interrupts and level triggered interrupts.

The method 300 may optionally include selectively determining whether a particular interrupt is replayed, at 306. For example, the isolation circuit 108 of FIG. 1 may include logic for choosing whether an interrupt saved at the interrupt monitor 102 is provided to the interrupt controller 106 via the data path 114.

The method 300 may further include replaying at least some of the interrupts saved by the interrupt monitor to the interrupt controller for processing by a processor when the processor is powered up, at 308. For example, the interrupt monitor 102 of FIG. 1 may replay at least some of the saved interrupts to the interrupt controller 106 when the processor 104 and the interrupt controller 106 are powered up.

Figure 4:
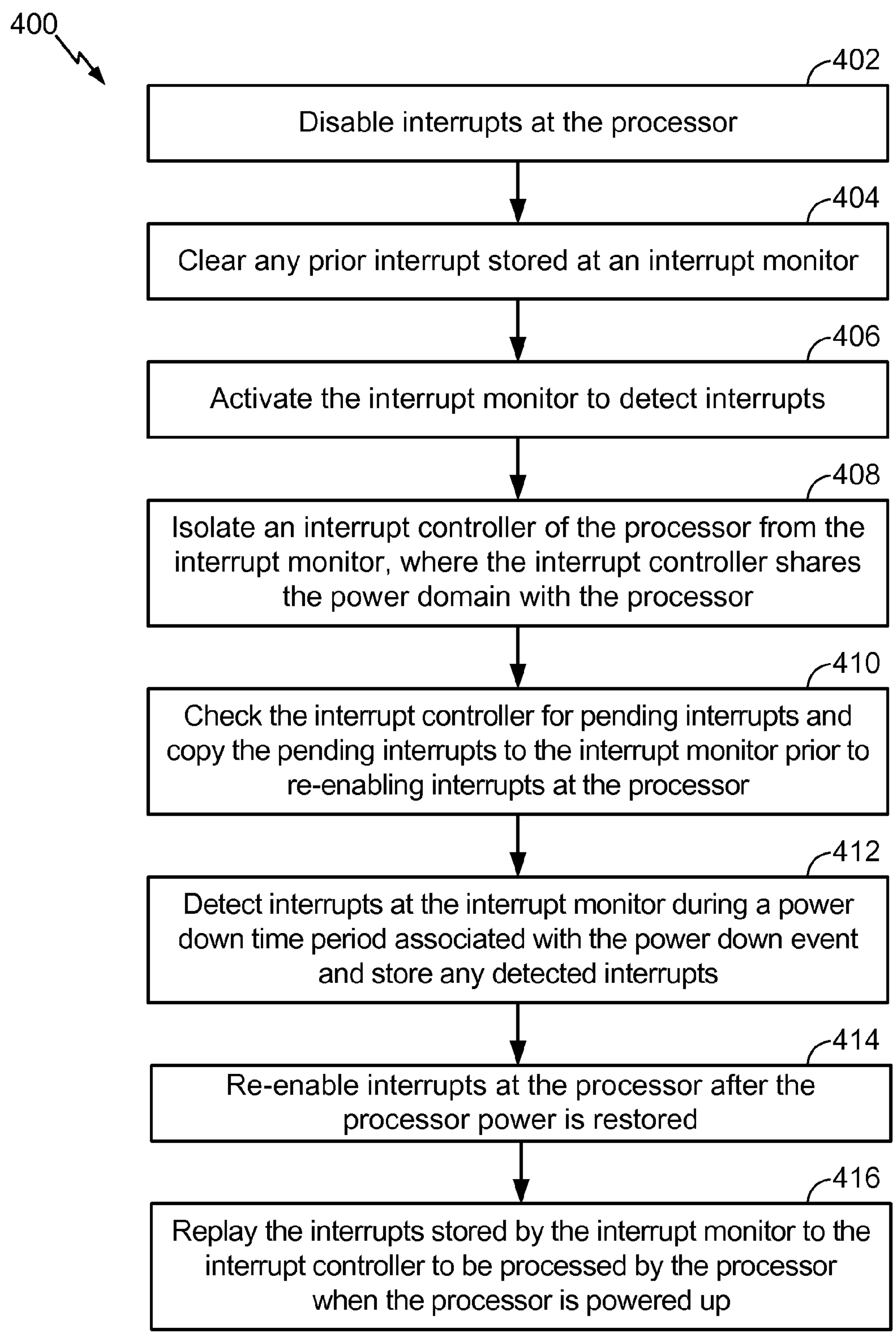
FIG. 4 is a flow chart of a second particular illustrative embodiment of a method of monitoring interrupts during a power event.

Referring to FIG. 4, a particular embodiment of a method 400 of monitoring interrupts during a power down event at a processor is illustrated. The method 400 may include disabling interrupts at the processor, at 402, and clearing any prior interrupt stored at an interrupt monitor, at 404.

The method 400 may further include activating the interrupt monitor to detect interrupts, at 406. In a particular embodiment, activating the interrupt monitor to detect interrupts includes controlling a first isolation multiplexer to enable the interrupt monitor to receive incoming interrupts. For example, the multiplexer 220 of the interrupt monitor 202 of FIG. 2 may be selectively controlled by a control signal provided over the data path 230. A low logic level control signal may enable the interrupt detection circuit 218 of the interrupt monitor to receive incoming interrupts from the interrupt source 254 via the data path 110. The low logic level control signal may be provided to the multiplexer 220 during a power down event. The power down event may include a period of time in which the power manager prepares to cause the processor 104 and the interrupt controller 106 to enter the low power state. The control signal provided via the data path 230 may be provided by the state machine 256.

The method 400 may further include isolating an interrupt controller of the processor from the interrupt monitor, where the interrupt controller shares the power domain with the processor, at 408. In a particular embodiment, isolating the interrupt controller from the interrupt monitor includes controlling a second isolation multiplexer to block incoming interrupts from being sent to the interrupt controller. For example, the multiplexer 224 of the interrupt monitor 202 of FIG. 2 may be selectively controlled by a control signal provided over the data path 234. The control signal provided via the data path 234 may be provided by the state machine 256.

The method 400 may further include checking the interrupt controller for pending interrupts and copying the pending interrupts to the interrupt monitor, at 410. For example, the interrupt controller 106 of FIG. 2 may have pending interrupts 252 when the power manager 216 initiates a power down event. At least some of the pending interrupts may not be processed by the interrupt controller 106 prior to entering the low power state. To avoid losing the pending interrupts 252, the processor 104 may check the interrupt controller 106 for pending interrupts 252 and may copy the pending interrupts 252 to the memory 228. The processor 104 may check the interrupt controller 106 for pending interrupts 252 as the power manager 216 prepares to initiate the power down event and during the power down event until the interrupt controller 106 enters the low power state. The processor 104 may also check the interrupt controller 106 for pending interrupts 252 when the interrupt controller is in the powered up state. Alternatively, the processor 104 may check for pending interrupts 252 when a power down event is initiated and may send the pending interrupts 252 to the interrupt monitor 202 to be stored at the memory 228.

The method 400 may further include detecting interrupts at the interrupt monitor during a power down time period associated with the power down event and storing any detected interrupts, at 412. For example, during a power down time associated with the power down event, the interrupt monitor 102 of FIG. 1 may receive and detect interrupts via the data path 110. The interrupt monitor 102 may be configured to detect interrupts when the processor 104 and the interrupt controller 106 are preparing to enter a low power state. Also, the interrupt monitor 102 may include circuitry for storing the detected interrupt, such as the memory 228 of FIG. 2. The memory 228 may include one or more registers using flip-flops or any other type of memory configuration for storing the detected interrupts. The stored interrupts may include edge triggered interrupts and level triggered interrupts.

The method 400 may further include re-enabling interrupts at the processor, at 414. In a particular embodiment, re-enabling interrupts at the processor includes controlling the second isolation multiplexer to enable the interrupt controller to receive incoming signals from a replay selection multiplexer. For example, the multiplexer 224 of FIG. 2 may be controlled to enable the interrupt controller 106 to receive incoming signals from the multiplexer 222.

The method 400 may further include replaying the interrupts stored by the interrupt monitor to the interrupt controller for processing by the processor when the processor is powered up, at 416. In a particular embodiment, replaying the stored interrupts includes controlling the replay selection multiplexer to select the replayed interrupts from the interrupt monitor to be output to the interrupt controller. For example, the multiplexer 222 of the interrupt monitor 202 of FIG. 2 may be selectively controlled by a control signal provided over the data path 232. A high logic level control signal may be provided to the multiplexer 222 upon powering up the processor 104 after a power down event. The control signal provided via the data path 232 may be provided by the state machine 256.

During a replay of stored interrupts, the interrupt monitor may continue to detect incoming interrupts that are received via the first isolation multiplexer. For example, the interrupt monitor may include asynchronous flip-flop elements that are configured to record incoming interrupts that are received during a replay cycle and to replay the recorded interrupts during the replay cycle. After replay of stored interrupts (including interrupts received at the interrupt monitor during the replay cycle), the second isolation multiplexer may be controlled to route incoming interrupts to the interrupt controller.

Figure 5:
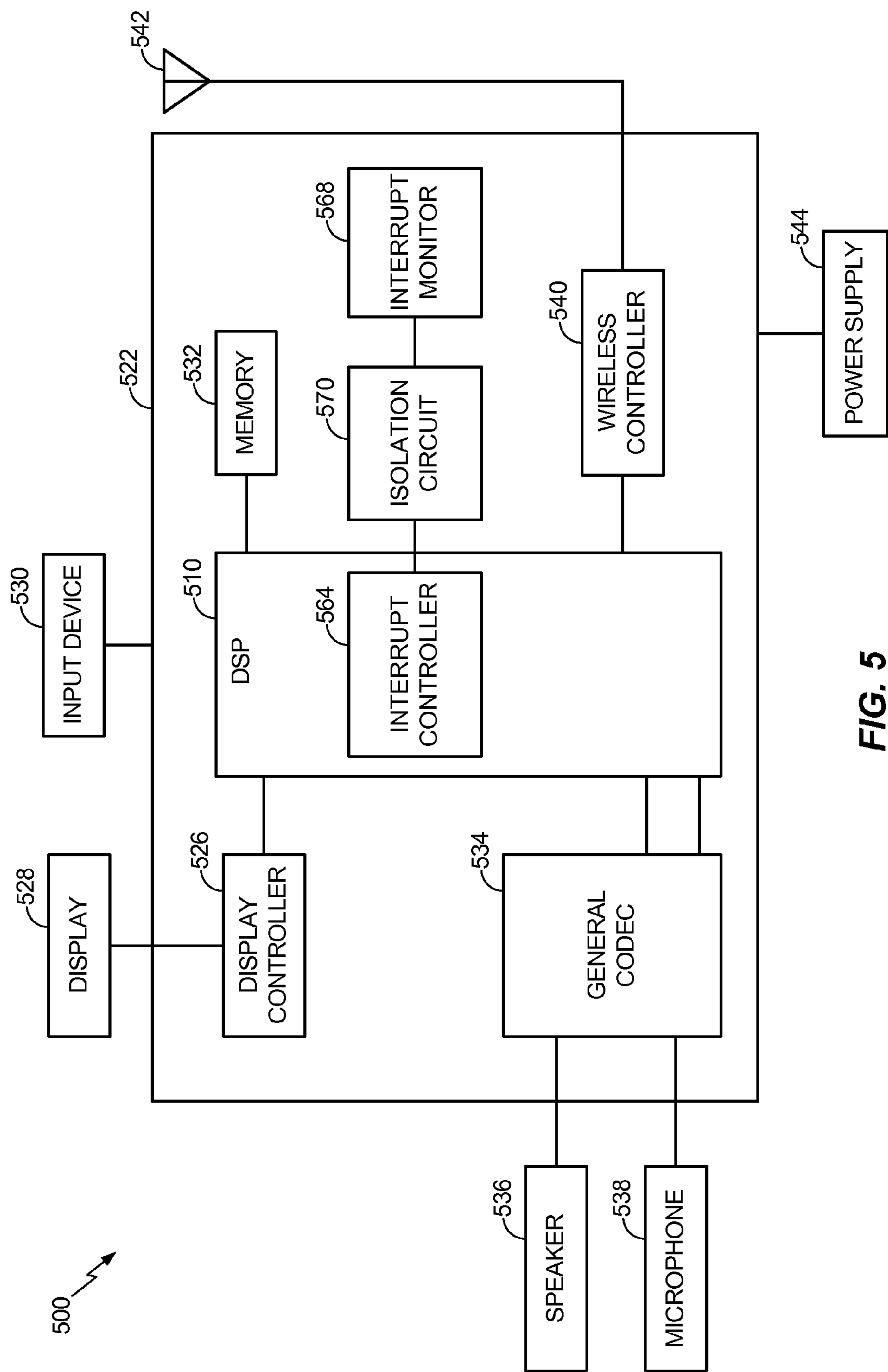
FIG. 5 is a block diagram of a wireless device including an apparatus for monitoring interrupts during a power event.

Referring to FIG. 5, a block diagram of a particular illustrative embodiment of an electronic device including an apparatus for monitoring interrupts during a power down event is depicted and generally designated 500. The device 500 includes a processor, such as a digital signal processor (DSP) 510, coupled to a memory 532. The DSP 510 may include an interrupt controller 564 configured to process incoming interrupts. The interrupt controller 564 may selectively receive interrupts from an interrupt monitor 568 via an isolation circuit 570. In an illustrative example, the interrupt monitor 568 includes the edge detection circuit 226 and the memory 228 depicted in FIG. 2 and has circuit parameters determined using one or more of the systems of FIGS. 1-2, one or more of the methods of FIGS. 3-4, or any combination thereof.

FIG. 5 also shows a display controller 526 that is coupled to the digital signal processor 510 and to a display 528. The digital signal processor 510 includes an interrupt controller 564 coupled to an isolation circuit 570 and an interrupt monitor 568 in accordance with the teachings of the present disclosure. A coder/decoder (CODEC) 534 can also be coupled to the digital signal processor 510. A speaker 536 and a microphone 538 can be coupled to the CODEC 534.

FIG. 5 also indicates that a wireless controller 540 can be coupled to the digital signal processor 510 and to a wireless antenna 542. In a particular embodiment, the DSP 510, the interrupt controller 564, the display controller 526, the memory 532, the CODEC 534, the wireless controller 540, the interrupt monitor 568, and the isolation circuit 570 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, and the power supply 544 are external to the system-on-chip device 522. However, each of the display 528, the input device 530, the speaker 536, the microphone 538, the wireless antenna 542, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. IN the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of monitoring interrupts at a processor, the method comprising:

activating an interrupt monitor to detect interrupts;

isolating an interrupt controller of the processor from the interrupt monitor, wherein the interrupt controller shares a first power domain with the processor;

detecting interrupts at the interrupt monitor during a power down time period associated with a power down event; and determining whether a particular interrupt that is saved at an internal memory of the interrupt monitor is to be provided to the interrupt controller when the processor is powered up;

wherein pending interrupts awaiting processing at the interrupt controller when the power down event is initiated are copied to the internal memory of the interrupt monitor, and wherein the pending interrupts are replayed to the interrupt controller prior to providing the particular interrupt to the interrupt controller when the processor is powered up.

2. The method of claim 1, further comprising saving the detected interrupts at the internal memory of the interrupt monitor, wherein the detected interrupts include the particular interrupt.

3. The method of claim 2, further comprising when the processor is powered up, providing at least some of the detected interrupts saved by the internal memory of the interrupt monitor to the interrupt controller for processing by the processor.

4. The method of claim 1, further comprising detecting interrupts at the interrupt monitor prior to the power down time period.

5. The method of claim 1, wherein at least one of the interrupts is an edge triggered interrupt.

6. A method of monitoring interrupts during a power down event at a processor, the method comprising:

clearing any prior interrupt stored at an interrupt monitor;

activating the interrupt monitor to detect interrupts;

isolating an interrupt controller of the processor from the interrupt monitor, wherein the interrupt controller shares a first power domain with the processor;

detecting interrupts at the interrupt monitor during a power down time period associated with the power down event and storing the detected interrupts;

determining whether to provide a particular interrupt stored at an internal memory of the interrupt monitor to the interrupt controller when the processor is powered up; and when the processor is powered up, selectively providing the particular interrupt to the interrupt controller to be processed by the processor based on the determination;

wherein pending interrupts awaiting processing at the interrupt controller when the power down event is initiated are copied to the internal memory of the interrupt monitor, and wherein the pending interrupts are replayed to the interrupt controller from the internal memory of the interrupt monitor prior to providing the particular interrupt to the interrupt controller when the processor is powered up.

7. The method of claim 6, further comprising disabling interrupts at the processor prior to clearing any prior interrupt stored at the interrupt monitor.

8. The method of claim 6, wherein activating the interrupt monitor includes controlling a first isolation multiplexer to enable the interrupt monitor to receive incoming interrupts from an interrupt source.

9. The method of claim 8, wherein isolating the interrupt controller includes controlling a second isolation multiplexer to block the incoming interrupts from being sent to the interrupt controller.

10. The method of claim 8, wherein providing the particular interrupt to the interrupt controller includes:

controlling a second isolation multiplexer to enable the interrupt controller to receive incoming signals from a replay selection multiplexer; and controlling the replay selection multiplexer to select the replayed interrupts from the interrupt monitor to be output to the interrupt controller.

11. The method of claim 6, further comprising re-enabling interrupts at the processor after isolating the interrupt controller from the interrupt monitor.

12. The method of claim 6, further comprising:

detecting an edge of an incoming edge triggered interrupt at an edge detection circuit.

13. An interrupt monitor comprising:

an interrupt detection circuit to detect interrupts;

a first multiplexer to selectively provide incoming interrupts to the interrupt detection circuit during a power down time period associated with a power down event;

a second multiplexer to selectively isolate an interrupt controller of a processor from the interrupt monitor, wherein the interrupt controller shares a first power domain with the processor;

an internal memory of the interrupt monitor to save detected interrupts; and a third multiplexer to selectively provide a particular interrupt that is saved at the internal memory of the interrupt monitor to the interrupt controller when the processor is powered up;

wherein pending interrupts awaiting processing at the interrupt controller when the power down event is initiated are copied to the internal memory of the interrupt monitor, and wherein the pending interrupts are replayed to the interrupt controller from the internal memory of the interrupt monitor prior to providing the particular interrupt to the interrupt controller when the processor is powered up.

14. The interrupt monitor of claim 13, wherein the particular interrupt is provided to the interrupt controller for processing by the processor.

15. The interrupt monitor of claim 13, wherein the interrupt detection circuit is configured to detect edge and level sensitive interrupts.

16. An apparatus comprising:

a processor comprising an interrupt controller, wherein the interrupt controller shares a first power domain with the processor; and an interrupt monitor coupled to the processor, the interrupt monitor comprising: an interrupt detection circuit to detect interrupts;

a first multiplexer to selectively provide incoming interrupts to the interrupt detection circuit during a power down time period associated with a power down event;

a second multiplexer to selectively isolate the interrupt controller from the interrupt monitor; and a third multiplexer to selectively provide a particular interrupt that is saved at an internal memory of the interrupt monitor to the interrupt controller when the processor is powered up;

wherein pending interrupts awaiting processing at the interrupt controller when the power down event is initiated are copied to the internal memory of the interrupt monitor, and wherein the pending interrupts are replayed to the interrupt controller from the internal memory of the interrupt monitor prior to providing the particular interrupt to the interrupt controller when the processor is powered up.

17. The apparatus of claim 16, wherein the interrupt controller shares a power domain with the processor and wherein the interrupt monitor is separately powered.

18. The apparatus of claim 16, further comprising a power manager.

19. The apparatus of claim 18, wherein the power manager provides power to the processor and to the interrupt controller.

20. A computer-readable storage medium comprising instructions that, when executed by a processor, cause the processor to:

receive, at an interrupt controller within the processor, a particular interrupt saved at an internal memory of an interrupt monitor, wherein the interrupt controller shares a first power domain with the processor, wherein the interrupt controller is isolated from the interrupt monitor;

wherein the interrupt monitor determines whether to provide the particular interrupt to the interrupt controller when the processor is powered up;

wherein pending interrupts awaiting processing at the interrupt controller when a power down event is initiated are copied to the internal memory of the interrupt monitor, and wherein the pending interrupts are replayed to the interrupt controller from the internal memory of the interrupt monitor prior to providing the particular interrupt to the interrupt controller when the processor is powered up.

21. The computer-readable storage medium of claim 20, wherein the particular interrupt is saved at the internal memory of the interrupt monitor during a power down time period.

22. The computer-readable storage medium of claim 21, wherein incoming interrupts are provided to an interrupt detection circuit of the interrupt monitor during the power down time period, and wherein the incoming interrupts include the particular interrupt.

23. An apparatus comprising:

means for processing interrupts, wherein the means for processing interrupts includes means for receiving a particular interrupt that shares a first power domain with the means for processing interrupts; and means for monitoring interrupts, wherein the means for monitoring interrupts includes:

means for detecting interrupts;

means for providing incoming interrupts to the means for detecting interrupts during a power down time period associated with a power down event;

means for isolating the means for receiving the particular interrupt from the means for monitoring interrupts; and means for providing the particular interrupt to the means for receiving the particular interrupt when the means for processing interrupts is powered up;

wherein pending interrupts awaiting processing at the means for receiving the particular interrupt when the power down event is initiated are copied to an internal memory of the means for monitoring interrupts, and wherein the pending interrupts are replayed to the means for receiving the particular interrupt from the internal memory of the means for monitoring interrupts prior to providing the particular interrupt to the means for receiving the particular interrupt when the means for processing interrupts is powered up.

24. The apparatus of claim 23, wherein the means for providing the particular interrupt includes a first multiplexer.

25. The apparatus of claim 23, wherein the means for isolating includes a second multiplexer.

* * * * *